(12) United States Patent
Kim

(10) Patent No.: US 8,369,703 B2
(45) Date of Patent: Feb. 5, 2013

(54) MOVING PICTURE CAMERA AND ELECTRONIC DEVICE INCLUDING THE SAME

(75) Inventor: Sung Hyun Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/923,795

(22) Filed: Oct. 7, 2010

(65) Prior Publication Data

US 2011/0096456 A1    Apr. 28, 2011

(30) Foreign Application Priority Data

Oct. 23, 2009  (KR) ........................ 10-2009-0101364

(51) Int. Cl.
*G03B 17/02* (2006.01)
*H01H 47/00* (2006.01)
(52) U.S. Cl. ...................... 396/535; 361/220
(58) Field of Classification Search ................ 396/535; 361/220

See application file for complete search history.

(56) References Cited

U.S. PATENT DOCUMENTS

| | | | | |
|---|---|---|---|---|
| 5,047,835 A * | 9/1991 | Chang | ........................... | 257/433 |
| 6,181,558 B1 * | 1/2001 | Gordon | ........................... | 361/699 |
| 6,576,832 B2 * | 6/2003 | Svarfvar et al. | ............... | 174/392 |
| 6,858,794 B2 * | 2/2005 | Jensen et al. | ................... | 174/355 |
| 7,310,236 B2 * | 12/2007 | Takahashi et al. | ........... | 361/757 |
| 7,738,264 B2 * | 6/2010 | Christol et al. | ............... | 361/818 |
| 2003/0112364 A1 * | 6/2003 | Tanida et al. | ................... | 348/375 |
| 2004/0156175 A1 * | 8/2004 | Nakamura et al. | ............ | 361/720 |
| 2005/0174468 A1 * | 8/2005 | Herranen et al. | ............. | 348/340 |
| 2005/0265710 A1 * | 12/2005 | Shirakata et al. | ............. | 396/349 |
| 2007/0109747 A1 * | 5/2007 | Sengoku et al. | .............. | 361/714 |
| 2009/0303360 A1 * | 12/2009 | Huang | .......................... | 348/294 |

FOREIGN PATENT DOCUMENTS

JP    08051291 A  *  2/1996
JP    2009-217084     9/2009

OTHER PUBLICATIONS

Machine translation of JP 08-051291.*

* cited by examiner

*Primary Examiner* — Clayton E LaBalle
*Assistant Examiner* — Linda B Smith

(57) ABSTRACT

There is provided a moving picture camera. The moving picture camera includes a case having an internal space, a frame supporting a camera module in the internal space, a printed circuit board on which circuit devices are mounted, the circuit devices receiving and processing a moving picture signal captured by the camera module, and an electrostatic transfer gasket interposed between the frame and the printed circuit board and transferring static electricity from the frame to the printed circuit board.

17 Claims, 7 Drawing Sheets

MOVING PICTURE CAMERA AND ELECTRONIC DEVICE INCLUDING THE SAME

CROSS-REFERENCE TO RELATED APPLICATIONS

This application claims the priority of Korean Patent Application No. 10-2009-0101364 filed on Oct. 23, 2009, in the Korean Intellectual Property Office, the disclosure of which is incorporated herein by reference.

BACKGROUND OF THE INVENTION

1. Field of the Invention

The present invention relates to a moving picture camera and an electronic device including the same, and more particularly, to a moving picture camera capable of minimizing defective operation caused by electrostatic discharge (ESD), and reducing electromagnetic interference (EMI), and an electronic device including the same.

2. Description of the Related Art

As video communications technologies have recently been developed at an accelerated rate, desk top computers and mobile communications terminals, such as portable phones, personal digital assistants (PDA) or laptop computers, have been mounted with moving picture cameras and released onto the market.

These moving picture cameras are advancing from existing computer video cameras or video communications modules for mobile communications terminals into Voice over Internet Protocol (VoIP) moving picture cameras enabling high-end video communications.

Like typical electronic devices, moving picture cameras need to be manufactured according to electromagnetic compatibility (EMC).

In particular, a moving picture camera operates at high frequencies so as to output HD images. Therefore, there is the need to solve the limitations caused by electromagnetic interference (EMI) and electrostatic discharge (ESD).

Furthermore, the moving picture camera, operating at the high frequency of 30 fps (frame rate per second) so as to output HD images, may experience excessive heat generation from an image sensor.

SUMMARY OF THE INVENTION

An aspect of the present invention provides a moving picture camera having a structure for minimizing a defective operation caused by electrostatic discharge (ESD) and reducing electromagnetic interference (EMI).

An aspect of the present invention also provides an electronic device including the moving picture camera.

According to an aspect of the present invention, there is provided a moving picture camera including: a case having an internal space; a frame supporting a camera module in the internal space; a printed circuit board on which circuit devices are mounted, the circuit devices receiving and processing a moving picture signal captured by the camera module; and an electrostatic transfer gasket interposed between the frame and the printed circuit board and transferring static electricity from the frame to the printed circuit board.

The printed circuit board may include a ground pattern exposed on a surface of the printed circuit board contacting the electrostatic transfer gasket.

The ground pattern may be disposed on an edge portion of the printed circuit board, and the circuit devices may be arranged on the inside of the edge portion of the printed circuit board.

The moving picture camera may further include a flexible printed circuit board electrically connected to the ground pattern and discharging static electricity to the outside.

The printed circuit board may be covered with an electromagnetic shield.

The electromagnetic shield may cover top and bottom surfaces of the printed circuit board.

The camera module may include an image sensor board on which an image sensor forming a moving picture is mounted, and the image sensor board is connected with the printed circuit board by a flexible printed circuit board.

The frame may have an opening through which the flexible printed circuit board passes.

The frame may include: a heat dissipation plate contacting the electrostatic transfer gasket; a front frame supporting the camera module; and a rear frame supporting a rear surface of the case.

The frame may include: extension frames extending in a longitudinal direction between the front frame and the heat dissipation plate and between the heat dissipation plate and the rear frame, respectively.

According to another aspect of the present invention, there is provided an electronic device including: a moving picture camera including a frame supporting a camera module and including a heat dissipation plate dissipating heat from the camera module, and a printed circuit board contacting the heat dissipation plate by the medium of an electrostatic transfer gasket; a chassis supporting a display panel displaying a moving picture sent from the moving picture camera; and a connector connecting the moving picture camera with the chassis so that static electricity discharged from the moving picture camera is discharged to the chassis.

The printed circuit board may include a ground pattern exposed on a top surface thereof contacting the electrostatic transfer gasket.

The ground pattern may be formed on an edge portion of the printed circuit board, and circuit devices may be disposed on the inside of the edge portion of the printed circuit board.

The printed circuit board may be covered with an electromagnetic shield.

A moving picture signal from the camera module may be sent to the printed circuit board via a flexible printed circuit board, and the frame may have an opening through which the flexible printed circuit board passes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
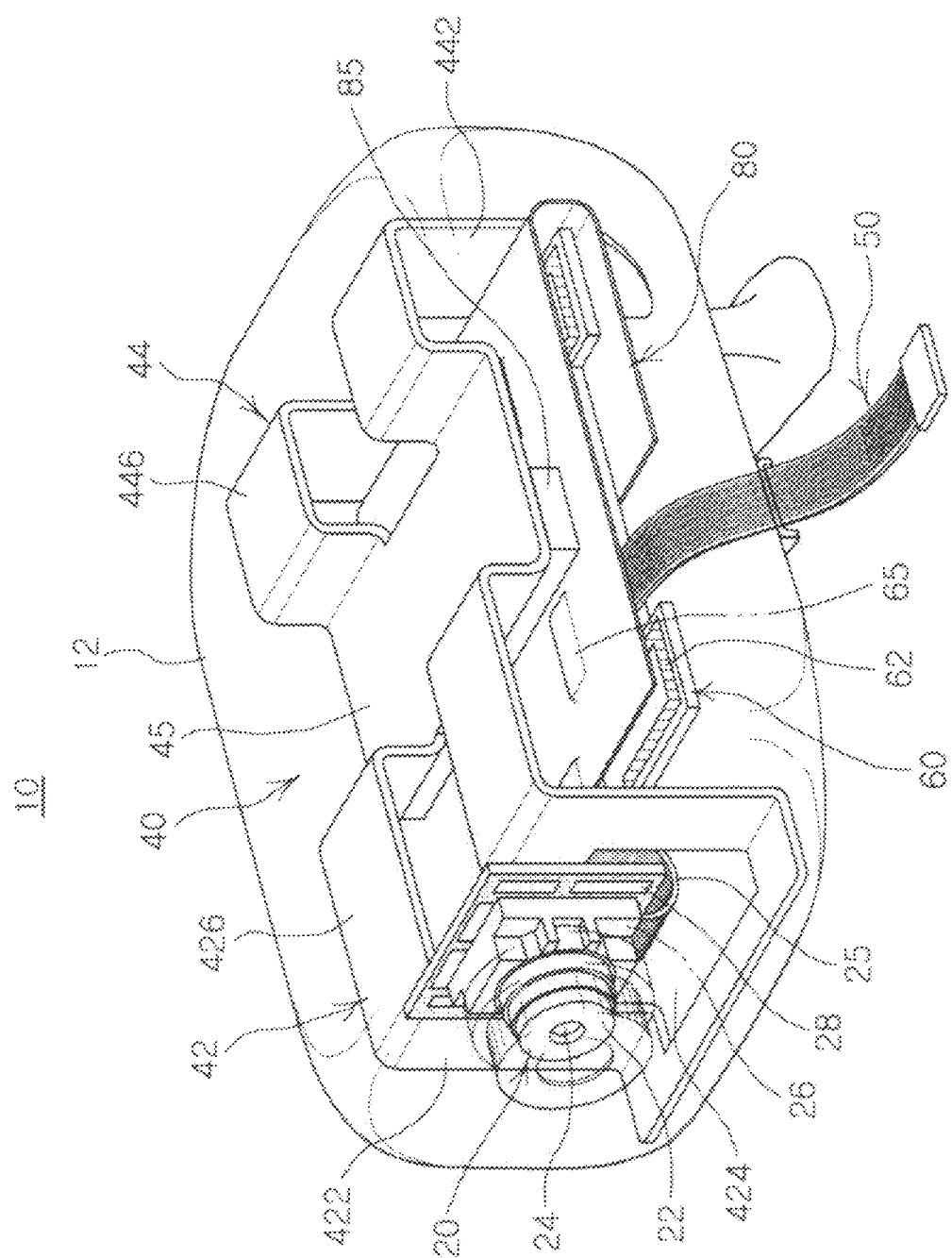
FIG. 1 is a schematic perspective view, with a cut-out portion, illustrating a moving picture camera according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, like reference numerals in the drawings denote like elements.

Figure 2:
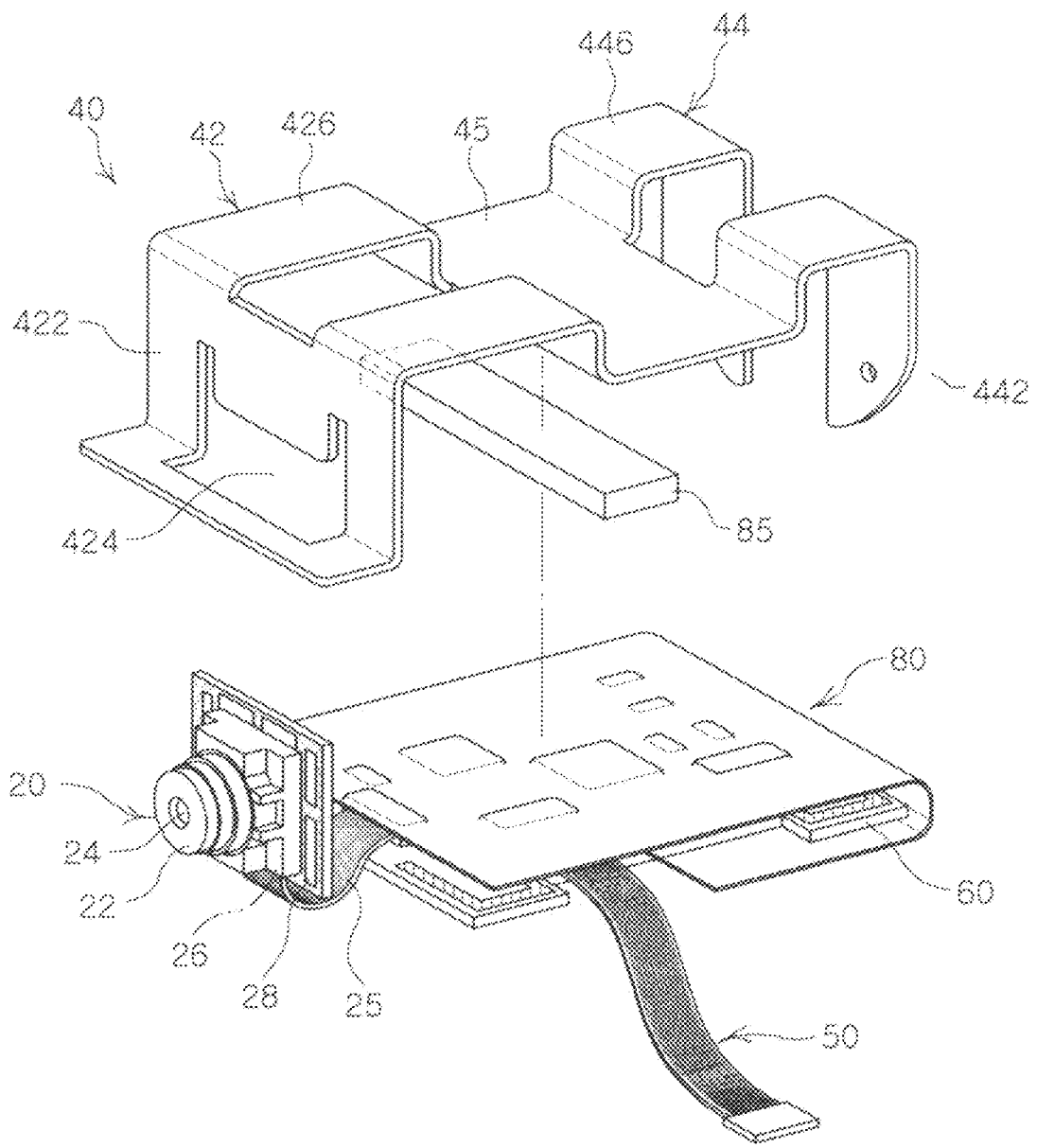
FIG. 2 is an exploded perspective view illustrating the internal structure of the moving picture camera according to the exemplary embodiment of the present invention.
Figure 3:
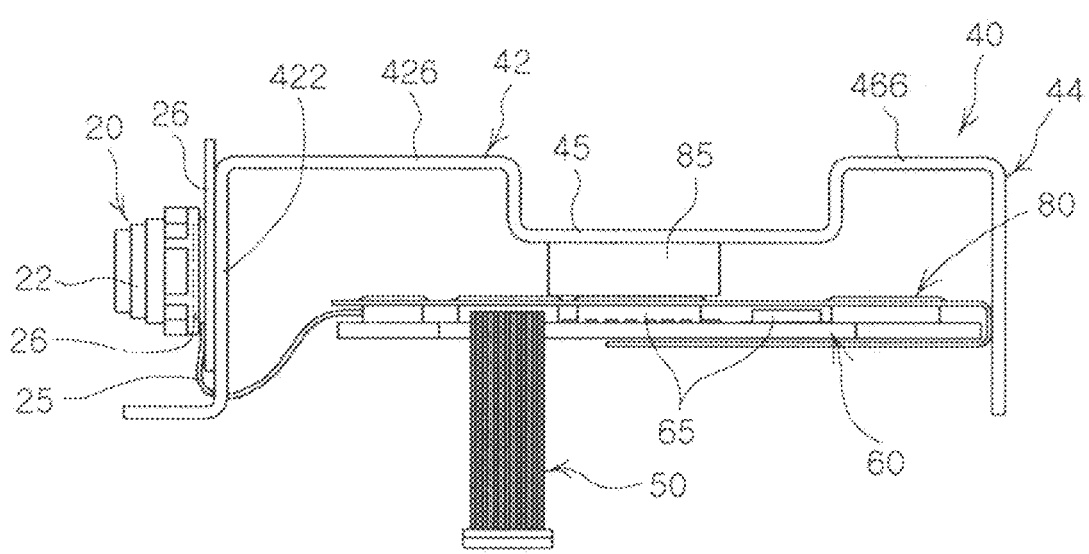
FIG. 3 is a side view illustrating the internal structure of the moving picture camera according to the exemplary embodiment of the present invention.

FIG. 1 is a schematic perspective view, with a cut-out portion, illustrating a moving picture camera according to an exemplary embodiment of the present invention. FIG. 2 is an exploded perspective view illustrating the internal structure of the moving picture camera according to the exemplary embodiment of the present invention. FIG. 3 is a side view illustrating the internal structure of the moving picture camera according to the exemplary embodiment of the present invention.

Referring to FIGS. 1 through 3, a moving picture camera 10, according to the exemplary embodiment of the present invention, may include a case 12, a frame 40, a printed circuit board 60, and an electrostatic transfer gasket 85.

Figure 5:
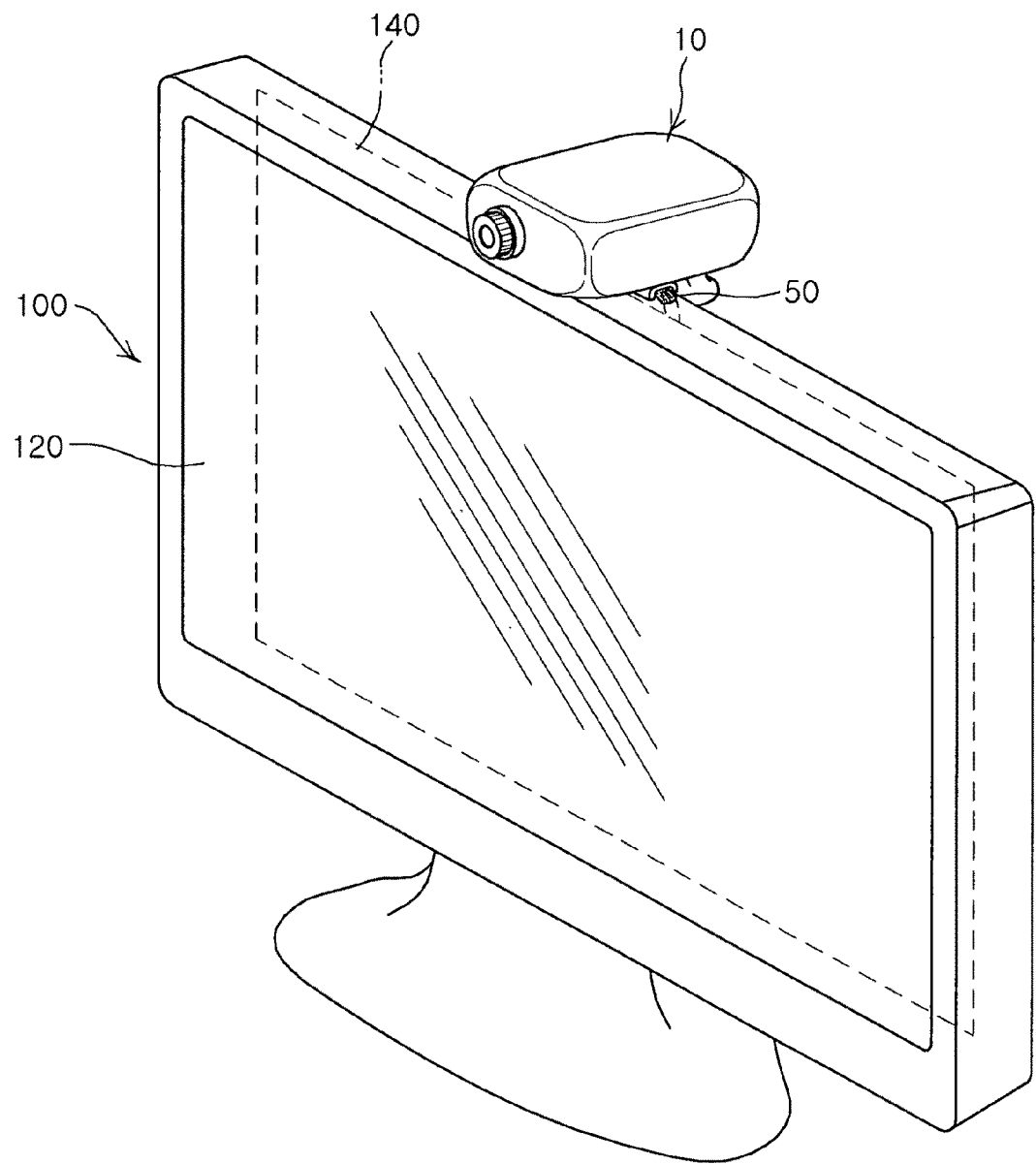
FIG. 5 is a schematic perspective view illustrating an electronic device utilizing a moving picture camera according to the exemplary embodiment of the present invention.

The case 12 has an internal space in which internal structures are arranged, and constitutes the exterior of the moving picture camera 10. The case 12 may have a connector that may be mounted to an electronic device 100 as shown in FIG. 5.

The frame 40 may have a structure that supports a camera module 20 for capturing a moving picture inside the case 12. Those skilled in the art may easily modify the frame 40, provided that the frame 40 supports the camera module 20 within the case 12.

The camera module 20 may include a housing 22, a lens 24 disposed in the housing 22 and used to capture a moving image, an image sensor 26 receiving light incident via the lens 24 and forming a moving image, and an image sensor board 28 on which the image sensor 26 is mounted.

The structure of the frame 40, according to this embodiment, will now be described. The frame 40 may include a heat dissipation plate 45, a front frame 42 supporting the camera module 20, and a rear frame 44 supporting the rear of the case 12. The heat dissipation plate 45, the front frame 42 and the rear frame 44 may be configured as an integrated structure.

Furthermore, the heat dissipation plate 45 may have a wide contact area with the outside in order to easily dissipate heat generated when the image sensor 26 processes a moving image at high rates.

The heat dissipation plate 45 may be formed at the central portion of the frame 40. The front frame 42 and the rear frame 44 may be formed at the front and rear sides of the heat dissipation plate 45, respectively.

Here, it is assumed that a direction from the front frame 42 toward the rear frame 44 is defined as a longitudinal direction of the moving picture camera 10.

The front frame 42 may support the camera module 20 while supporting the front surface of the case 12 in the longitudinal direction. The rear frame 44 may support the rear surface of the case 12 in the longitudinal direction.

The frame 40 may further include extension frames 426 and 446. The extension frame 426 extends in the longitudinal direction between the front frame 42 and the heat dissipation plate 45, and the extension frame 446 extends in the longitudinal direction between the heat dissipation plate 45 and the rear frame 44.

The front frame 42 may include a front support 422 extending downwardly from the extension frame 426 in order to support the camera module 20.

The rear frame 44 may have a rear support 442 extending downwardly from the extension frame 446 of the rear frame 44. The rear support 442 may have a coupling portion that may be coupled with the rear surface of the case 12.

Circuit devices 65, receiving and processing a moving picture signal captured by the camera module 20, are mounted on the printed circuit board 60.

The printed circuit board 60 is disposed between the front support 422 and the rear support 442. The electrostatic transfer gasket 85 is interposed between the printed circuit board 60 and the heat dissipation plate 45.

The image sensor board 28 and the printed circuit board 60 may be connected by a flexible printed circuit board 25. Here, the frame 40 has an opening 424 through which the flexible printed circuit board 25 passes, thereby simplifying the interconnection therebetween.

Also, the heat dissipation plate 45 is disposed immediately adjacent to the printed circuit board 60, thereby preventing a temperature increase when a moving picture is output at high rates.

The electrostatic transfer gasket 85 serves as a discharge passage for static electricity, so that static electricity transferred from the camera module 20 to the frame 40 can be discharged to a ground pattern 62 of the printed circuit board 60.

Since the electrostatic transfer gasket 85 is disposed between the frame 40 and the printed circuit board 60, an abnormal current or voltage surge, caused by power ON/OFF, can be handled stably.

Figure 4:
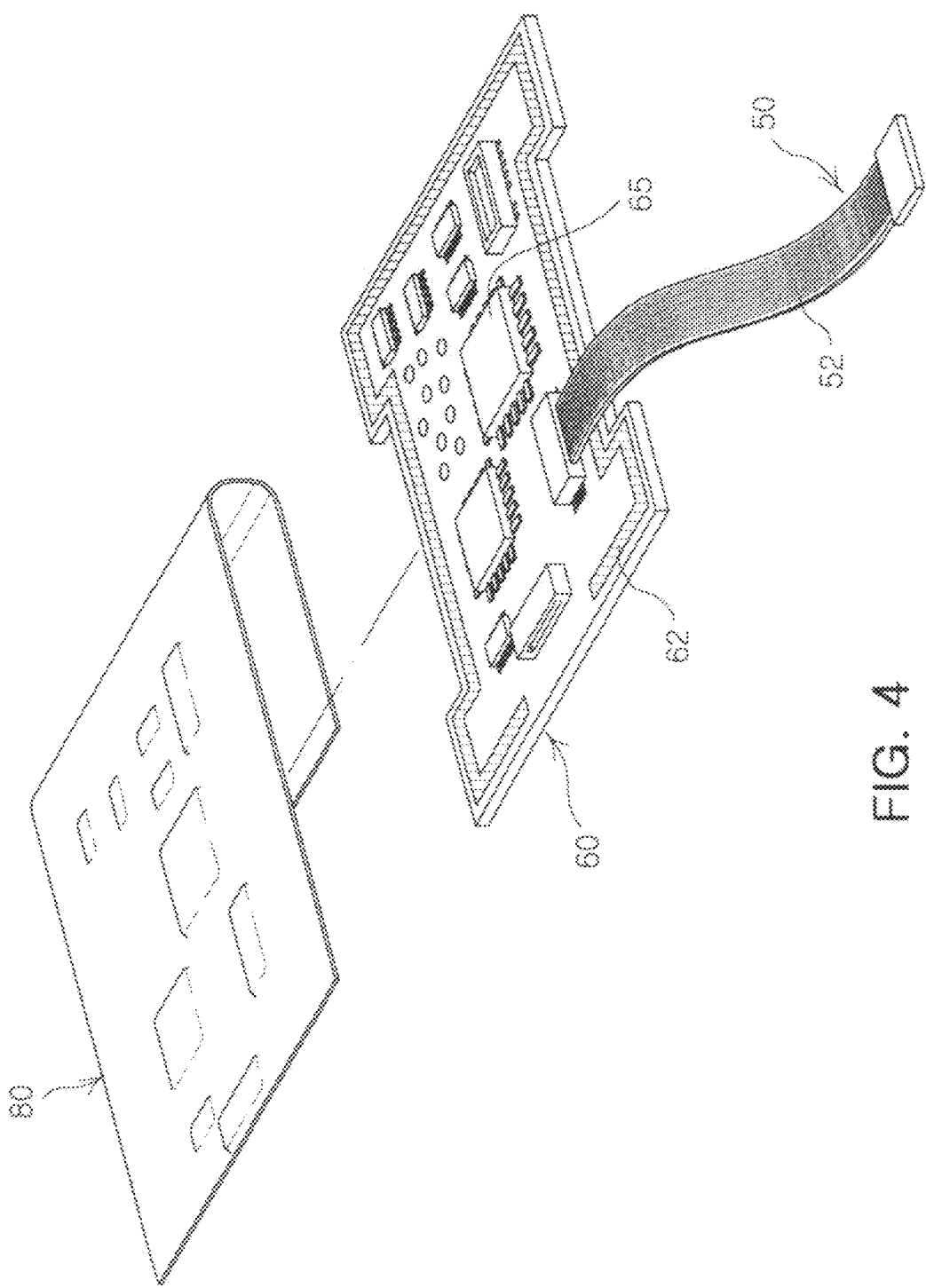
FIG. 4 is a schematic perspective view illustrating a printed circuit board applied to a moving picture camera and an electromagnetic shield, according to an exemplary embodiment of the present invention.

FIG. 4 is a schematic perspective view illustrating a printed circuit board applied to a moving picture camera and an electromagnetic shield covering the printed circuit board, according to an exemplary embodiment of the present invention.

Referring to FIG. 4, it can be seen how the ground pattern 62 is formed on the printed circuit board 60 and how the electromagnetic shield 80 covers the printed circuit board 60 in order to minimize EMI and defective operation caused by ESD.

The printed circuit board 60 has the ground pattern 62 exposed on its top surface contacting the electrostatic transfer gasket 85. Thus, the electrostatic transfer gasket 85 may directly contact the ground pattern 62, and this may be effective for ESD.

To maximize the area of the ground pattern 62, the ground pattern 62 may be formed on the edge portion of the printed circuit board 60.

The circuit devices 65 are disposed on the inside of the edge portion of the printed circuit board 60, and thus may be located as close to the center portion of the printed circuit board 60 as possible. Accordingly, the radiation surface for EMI may be limited to the central portion.

The printed circuit board 60 may be covered with the electromagnetic shield 80. Here, the electromagnetic shield 80 may cover both top and bottom of the printed circuit board 60.

Since the location of the circuit devices 65 is limited to the central portion of the printed circuit board 60, the electromagnetic shielding function of the electromagnetic shield 80 can be enhanced.

In order to discharge the static electricity of the printed circuit board 60 to the outside, a flexible printed circuit board 50 is connected to the printed circuit board 60. The flexible printed circuit board 50 is electrically connected with the ground pattern 62 and serves to discharge static electricity to the outside.

The flexible printed circuit board 50 may transfer a signal and static electricity to an electronic device 100. Hereinafter, an electronic device 100 to which the moving picture camera 10 is applied will be described in detail.

The moving picture camera 10 applied to the electronic device 100 may have all the technical features of the moving picture camera 10 described above.

FIG. 5 is a schematic perspective view illustrating an electronic device to which a moving picture camera is applied, according to an exemplary embodiment of the present invention.

According to an exemplary embodiment of the present invention, the electronic device 100 to which the moving picture camera is applied may include the moving picture camera 10, a chassis 140 and a connector.

As described above, the moving picture camera 10 may include the frame 40 supporting the camera module 20 and having the heat dissipation plate 45 dissipating the heat of the camera module 20, and the printed circuit board 60 contacting the heat dissipation plate 45 by the medium of the electrostatic transfer gasket 85.

The chassis 140 is a structure that supports a display panel 120 displaying a moving picture sent from the moving picture camera 10. Here, the chassis 140 is formed of a SUS material. However, the chassis 40 may be formed of any material that allows for ESD.

The moving picture camera 10 and the chassis 140 may be connected by a connector such that the static electricity discharged from the moving picture camera 10 is discharged to the chassis 140.

The connector may be the flexible printed circuit board 50 electrically connected with the ground pattern 62 and discharging static electricity to the outside.

Descriptions of other internal structures of the moving picture camera 10, such as the printed circuit board 60, the frame 40 and the like, may be substituted with the above description of the moving picture camera regarding FIGS. 1 through 4.

Hereinafter, the process of discharging heat and static electricity generated from the moving picture camera 10 to an external electronic device will now be described.

Figure 6:
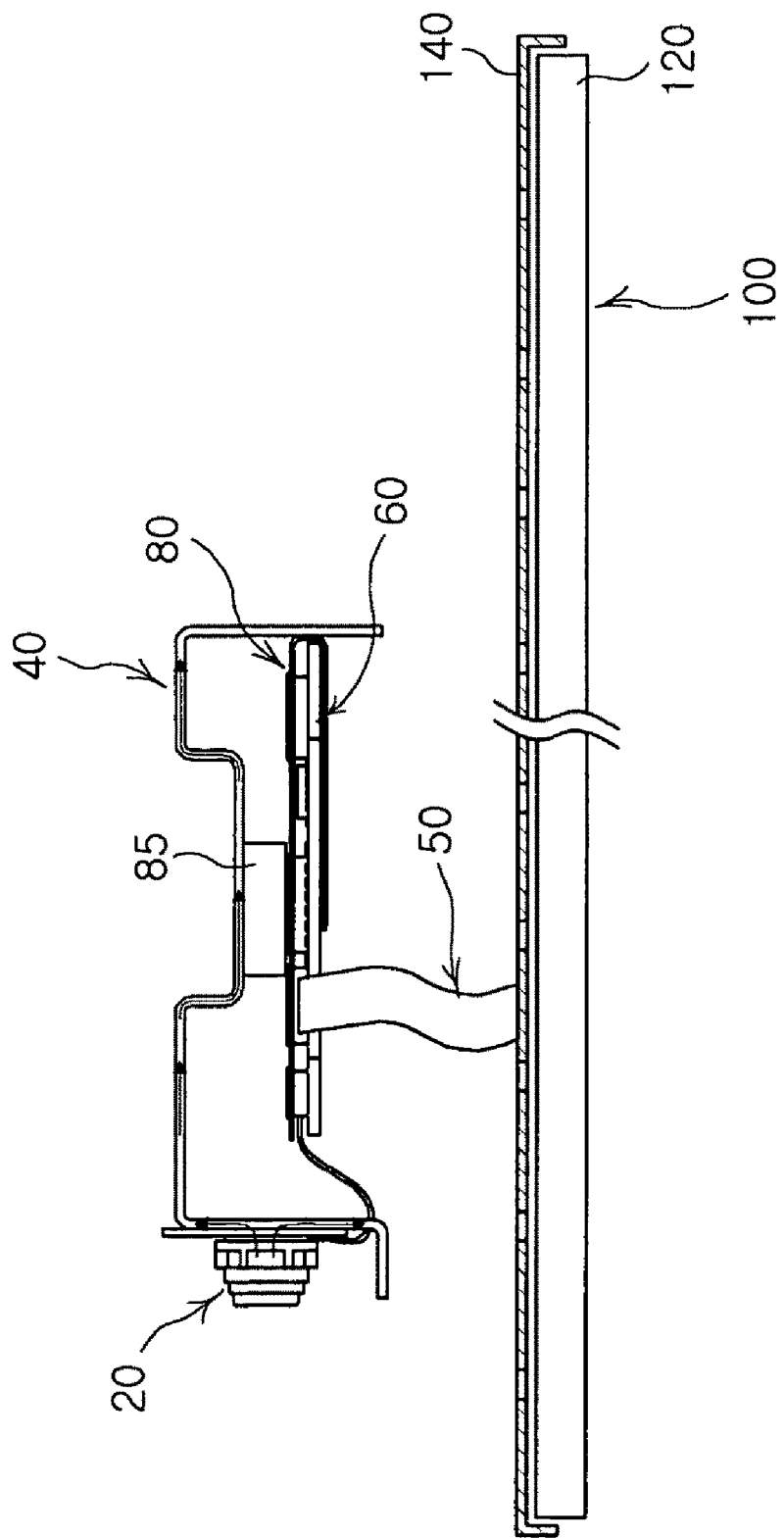
FIG. 6 is a schematic view illustrating how a moving picture camera dissipates heat, according to an exemplary embodiment of the present invention.
Figure 7:
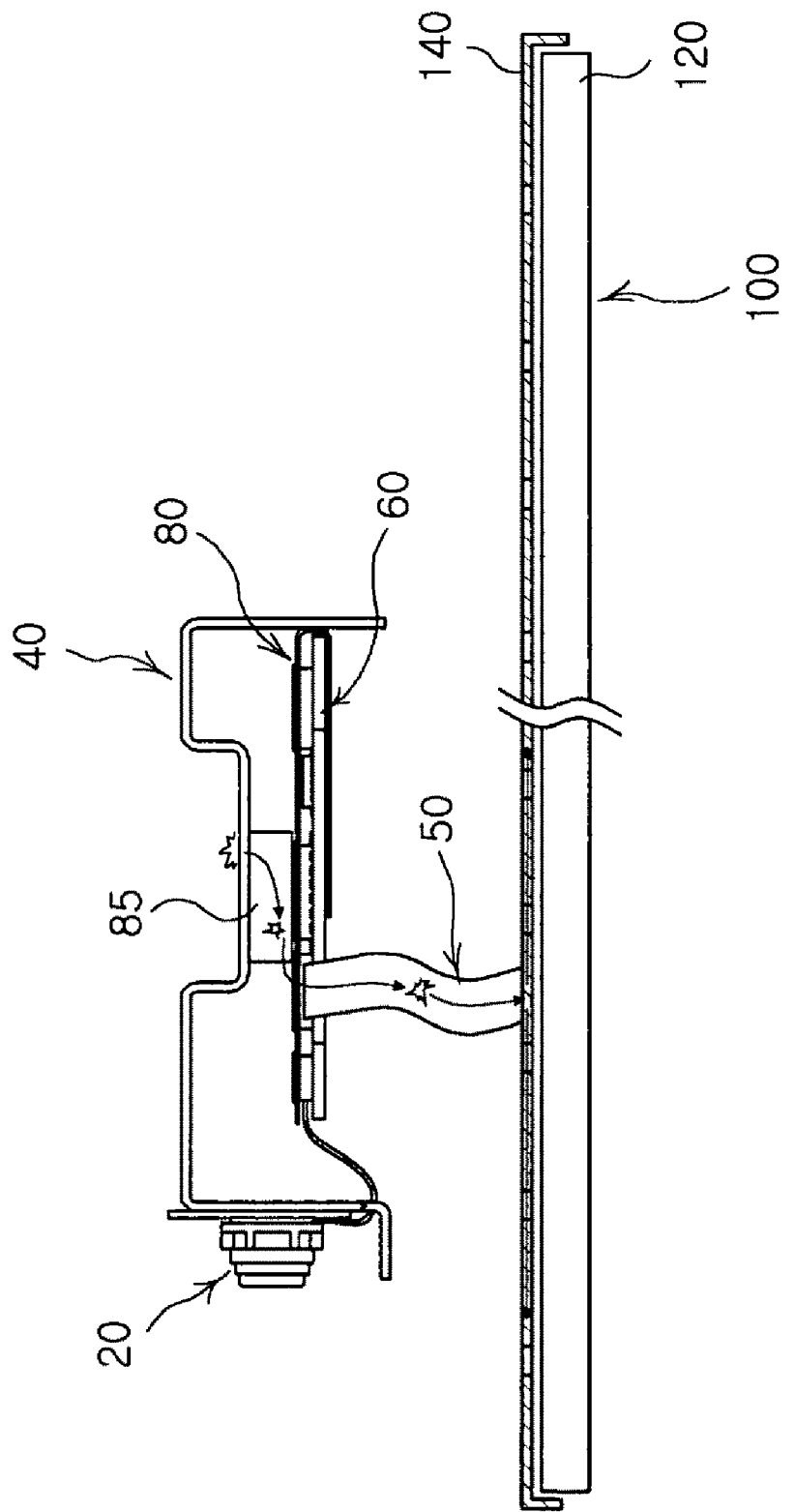
FIG. 7 is schematic view illustrating how static electricity generated from the moving picture camera is discharged, according to the exemplary embodiment of the present invention.

FIG. 6 is a schematic perspective view illustrating how the moving picture camera dissipates heat, according to an exemplary embodiment of the present invention. FIG. 7 is a schematic view illustrating how the static electricity generated from the moving picture camera is discharged to the outside, according to an exemplary embodiment of the present invention.

Referring to FIG. 6, when the moving picture camera 10 sends a moving picture signal at high rates, the image sensor 26 generates heat. This heat may be rapidly dissipated to the frame 40 including the heat dissipation plate 45 and the extension frames 426 and 446.

Referring to FIG. 7, abnormal current or voltage is generated from the moving picture camera 10 and thus static electricity flows to the frame 40. This static electricity flows from the frame 40 to the electrostatic transfer gasket 85 and to the ground pattern 62 of the printed circuit board 60. The static electricity then flows to the flexible printed circuit board 50 electrically connected to the ground pattern 62.

The flexible printed circuit board 50 is connected to the chassis 140 of the electronic device 100, so that the static electricity flows to the chassis 140 of the electronic device 100 and is discharged.

As set forth above, according to the moving picture camera and the electronic device including the same according to exemplary embodiments of the invention, the influence of EMI can be minimized by covering the printed circuit board with the electromagnetic shield.

Furthermore, the ground pattern is exposed on the surface of the printed circuit board contacting the electromagnetic shield, and the circuit devices are mounted in the ground pattern, thereby forming a structure that is efficient for electromagnetic shielding, and can easily discharge static electricity from the ground pattern to the outside.

Furthermore, since the electrostatic transfer gasket is provided between the heat dissipation plate of the frame and the electromagnetic shield, static electricity flowing into the heat dissipation plate due to a surge can be rapidly discharged, which is effective for ESD and noise suppression.

In addition, the frame is configured so as to accommodate the entire printed circuit board, thereby contributing to effectively utilizing the space within the moving picture camera and dissipating heat.

While the present invention has been shown and described in connection with the exemplary embodiments, it will be apparent to those skilled in the art that modifications and variations can be made without departing from the spirit and scope of the invention as defined by the appended claims.

What is claimed is:

1. A moving picture camera comprising:
    a case having an internal space;
    a frame supporting a camera module in the internal space, the frame being configured to receive and transfer static electricity produced by the camera module, the frame including a heat dissipation plate;
    a printed circuit board on which circuit devices are mounted, the circuit devices receiving and processing a moving picture signal captured by the camera module; and
    an electrostatic transfer gasket interposed between the frame and the printed circuit board, the electrostatic transfer gasket transferring the static electricity from the frame to the printed circuit board and transferring heat generated from the printed circuit board to the heat dissipation plate.

2. The moving picture camera of claim 1, wherein the printed circuit board includes a ground pattern exposed on a surface of the printed circuit board contacting the electrostatic transfer gasket.

3. The moving picture camera of claim 1, wherein the printed circuit board is covered with an electromagnetic shield.

4. The moving picture camera of claim 1, wherein the camera module includes an image sensor board on which an image sensor forming a moving picture is mounted, and the image sensor board is connected with the printed circuit board by a flexible printed circuit board.

5. The moving picture camera of claim 1, wherein the frame comprises:

a front frame supporting the camera module; and a rear frame supporting a rear surface of the case.

6. The moving picture camera of claim 1, wherein the heat dissipation plate is disposed immediately adjacent to the printed circuit board.

7. The moving picture camera of claim 2, wherein the ground pattern is disposed on an edge portion of the printed circuit board, and the circuit devices are arranged on the inside of the edge portion of the printed circuit board.

8. The moving picture camera of claim 2, further comprising a flexible printed circuit board electrically connected to the ground pattern and discharging static electricity to the outside.

9. The moving picture camera of claim 3, wherein the electromagnetic shield covers top and bottom surfaces of the printed circuit board.

10. The moving picture camera of claim 4, wherein the frame has an opening through which the flexible printed circuit board passes.

11. The moving picture camera of claim 5, wherein the frame comprises extension frames extending in a longitudinal direction between the front frame and the heat dissipation plate and between the heat dissipation plate and the rear frame, respectively.

12. An electronic device comprising:

a moving picture camera including a frame supporting a camera module and including a heat dissipation plate dissipating heat from the camera module, and a printed circuit board contacting the heat dissipation plate by the medium of an electrostatic transfer gasket, the frame being configured to receive and transfer static electricity discharged by the camera module, the electrostatic transfer gasket contacting the heat dissipation plate and transferring heat generated from the printed circuit board to the heat dissipation plate;

a chassis supporting a display panel displaying a moving picture sent from the moving picture camera; and a connector connecting the moving picture camera with the chassis so that the static electricity discharged from the moving picture camera is discharged to the chassis.

13. The electronic device of claim 12, wherein the printed circuit board includes a ground pattern exposed on a top surface thereof contacting the electrostatic transfer gasket.

14. The electronic device of claim 12, wherein the printed circuit board is covered with an electromagnetic shield.

15. The electronic device of claim 12, wherein a moving picture signal from the camera module is sent to the printed circuit board via a flexible printed circuit board, and the frame has an opening through which the flexible printed circuit board passes.

16. The electronic device of claim 12, wherein the heat dissipation plate is disposed immediately adjacent to the printed circuit board.

17. The electronic device of claim 13, wherein the ground pattern is formed on an edge portion of the printed circuit board, and circuit devices are disposed on the inside of the edge portion of the printed circuit board.

* * * * *